(12) United States Patent
Baxter

(10) Patent No.: US 11,597,131 B2
(45) Date of Patent: Mar. 7, 2023

(54) METHOD, ARTICLE AND ASSEMBLY FOR APPLYING A MULTI-LAYER FILM TO AN ELONGATE EXTRUDED ARTICLE

(71) Applicant: U.S. Farathane Corporation, Auburn Hills, MI (US)

(72) Inventor: Kevin Charles Baxter, Goodrich, MI (US)

(73) Assignee: U.S. Farathane Corporation, Auburn Hills, MI (US)

( * ) Notice: Subject to any disclaimer, the term of this patent is extended or adjusted under 35 U.S.C. 154(b) by 274 days.

(21) Appl. No.: 17/186,271

(22) Filed: Feb. 26, 2021

(65) Prior Publication Data

US 2021/0283811 A1 Sep. 16, 2021

Related U.S. Application Data

(60) Provisional application No. 62/989,973, filed on Mar. 16, 2020.

(51) Int. Cl.

| | |
|---|---|
| *B29C 48/00* | (2019.01) |
| *B32B 37/15* | (2006.01) |
| *B32B 27/36* | (2006.01) |
| *B60R 13/04* | (2006.01) |
| *B29C 48/30* | (2019.01) |

(Continued)

(52) U.S. Cl.
CPC ...... *B29C 48/0021* (2019.02); *B29C 48/0013* (2019.02); *B29C 48/30* (2019.02); *B29C 66/723* (2013.01); *B32B 7/12* (2013.01); *B32B 27/32* (2013.01); *B32B 27/36* (2013.01); *B32B 37/15* (2013.01); *B29K 2995/0097* (2013.01); *B32B 2307/71* (2013.01)

(58) Field of Classification Search
CPC ............ B29C 48/0021; B29C 48/0013; B29C 66/723; B29C 48/0022; B29C 48/12; B29C 48/21; B32B 7/12; B32B 27/32; B32B 27/36; B32B 37/15; B60R 13/04
See application file for complete search history.

(56) References Cited

U.S. PATENT DOCUMENTS

| | | |
|---|---|---|
| 3,423,231 A | 1/1969 | Lutzmann |
| 6,333,094 B1 | 12/2001 | Schneider et al. |

(Continued)

FOREIGN PATENT DOCUMENTS

| | | | | |
|---|---|---|---|---|
| CA | 2196378 A | * | 9/1997 | ............ B60R 13/04 |
| EP | 1938968 B1 | | 9/2011 | |

*Primary Examiner* — Robert B Davis
(74) *Attorney, Agent, or Firm* — Dinsmore & Shohl LLP

(57) ABSTRACT

A process and related assembly for creating an extrusion molded article with a chemically applied outer film. An extruded base material is formed during a first extrusion operation, following which a multi-layer film is bonded to the base material while the base material still at an above ambient temperature. The multi-layer film further includes successive layers of each of a polypropylene (PP), an adhesive, a polyethylene terephthalate (PET), a coating and s subsequent surface PET. The step of bonding of the film further occurs during an intermediate step between the first extrusion operation for forming the base material according to a given profile section and a subsequent extrusion operation for applying additional material along an edge of the film, the additional material including profile wings as required for a given design.

20 Claims, 3 Drawing Sheets

(51) Int. Cl.
    *B29C 65/00*     (2006.01)
    *B32B 27/32*     (2006.01)
    *B32B 7/12*     (2006.01)

(56) References Cited

U.S. PATENT DOCUMENTS

| | | |
|---|---|---|
| 8,783,751 B2 | 7/2014 | Bland et al. |
| 8,955,896 B2 | 2/2015 | Baxter et al. |
| 9,162,387 B2 | 10/2015 | Porter et al. |
| 9,744,710 B2 | 8/2017 | Porter et al. |
| 10,071,522 B2 | 9/2018 | Porter et al. |
| 10,179,435 B2 | 1/2019 | Porter et al. |
| 10,183,634 B1 | 1/2019 | Karmo et al. |
| 2008/0226866 A1 | 9/2008 | Vilcek et al. |
| 2009/0211702 A1* | 8/2009 | Aguiar .............. C09J 5/06 |
| | | 156/320 |
| 2010/0021737 A1 | 1/2010 | Beck et al. |
| 2017/0305245 A1 | 10/2017 | Lux et al. |
| 2018/0229480 A1 | 8/2018 | Chung |

\* cited by examiner

METHOD, ARTICLE AND ASSEMBLY FOR APPLYING A MULTI-LAYER FILM TO AN ELONGATE EXTRUDED ARTICLE

CROSS REFERENCE TO RELATED APPLICATIONS

The present application claims the priority of U.S. Ser. No. 62/989,973 filed Mar. 16, 2020.

FIELD OF THE INVENTION

The present invention relates generally to an extruded articles such as a roof ditch molding associated with a vehicle. More particularly, the present invention discloses a method and assembly for applying a multi-layered film composition, such as via chemical bonding techniques, to an extruded article. The multi-layered film can be provided according to a number of proprietary compositions which can include, without limitation, can include successive layers of each of a polypropylene (PP), adhesive, polyethylene terephthalate (PET), coating and subsequent surface PET layer. Chemical bonding of the film material can occur during an intermediate step between initial extrusion operations for forming each of the rigid base material according to a given profile section and applying a coating material, the film material being applied while the pre-extruded materials are still at an above ambient semi-molten temperature, following which a further extrusion of material can be applied along the film edge, such including added profile wings as required for a given design.

BACKGROUND OF THE INVENTION

The prior art is documented with extruded materials, such as for use without limitation in vehicle roof ditch applications. A first example is disclosed in U.S. Pat. No. 8,783,751 to Bland/Baxter for a coextruded roof ditch molding with hard and soft components and including an associated fastener system seated within a track of the molding for mounting to the vehicle roof ditch.

Karmo, U.S. Pat. No. 10,183,634, teaches an automotive ditch molding including a base with side portions extending from a central portion, an outer surface and an over-mold disposed over the outer surface. The over-mold defines first and second lips that extend downward transversely from the side portions of the base.

Schneider, U.S. Pat. No. 6,333,094, teaches a multilayer thermoformable composite synthetic veneer film having a multi-polyolefin base layer with a thickness of 100 to 500 μm. The film also includes at least one intermediate primer layer, bonding layer or bonding film or, respectively, bonding layer, along with an optional printing layer, coloring layer or color-printing layer arranged over part or all of its surface area. At least one polyester-containing single- or multiple-layer-structure layer or film includes at least one bonding layer, an adhesion-promoting layer or reactant layer on the side of the base layer that is to be applied to a substrate; with a surface-covering layer on the top of the film.

SUMMARY OF THE PRESENT INVENTION

The present invention discloses a process and related assembly for creating an extrusion molded article with a chemically applied outer film. The process includes the steps of forming an extruded base material during a first extrusion operation, applying a coating in a second extrusion operation and, immediately thereafter, bonding a multi-layer film while the base material and coating layers are still at an above ambient temperature.

Other steps include the multi-layer film further including, in non-limiting fashion, successive layers of each of a polypropylene (PP), an adhesive, a polyethylene terephthalate (PET), a coating and s subsequent surface PET. The step of bonding of the film further occurs following initial extrusion operations for respectively forming each of the rigid base material and coating layer, such as according to a given profile section, and a subsequent third stage extrusion operation for applying additional material along an edge of the previously applied film, the additional material including profile wings or other added features as required for a given design.

Other steps include providing a cross head die associated with each extrusion operation. The multi-layered film is chemically bonded to the base material at the second extrusion stage, again immediately following the application of the extrusion coating, and the subsequent extrusion stage further includes a third extruder stage for applying the profile wings. An end stage press is provided for finish forming and sectioning into lengths the extruded and chemical film coated article.

BRIEF DESCRIPTION OF THE DRAWINGS

Reference will not be made to the attached drawings, when read in combination with the following detailed description, wherein like reference numerals refer to like parts throughout the several views, and in which.

DETAILED DESCRIPTION OF THE PREFERRED EMBODIMENTS

With reference to the attached illustrations, the present invention discloses a method and related assembly for applying a multi-layered film composition assembly to an extrusion molded article. Without limitation, the film can include any proprietary multi-layer film exhibiting any desired finish or coloring, and which can be pre-produced and maintained in a roll or reel form for incorporating into the extruded article.

The multi-layer film is applied, such as via chemical bonding techniques, to a recently extruded article, such including a rigid base material and subsequently extruded coating layer. As will be described in further detail, the multi-layered film compositions can include, without limitation, successive layers of a polypropylene (PP), an adhesive, a polyethylene terephthalate (PET), a coating and a subsequent surface PET. Without further limitation, bonding of the film material can occur following each of a first (semi-molten) extrusion of a base material according to a given profile section and a second extrusion of a coating material, with a subsequent third extrusion of material along the film edges applying such as profile wings or other features as required for a given design.

Figure 1:
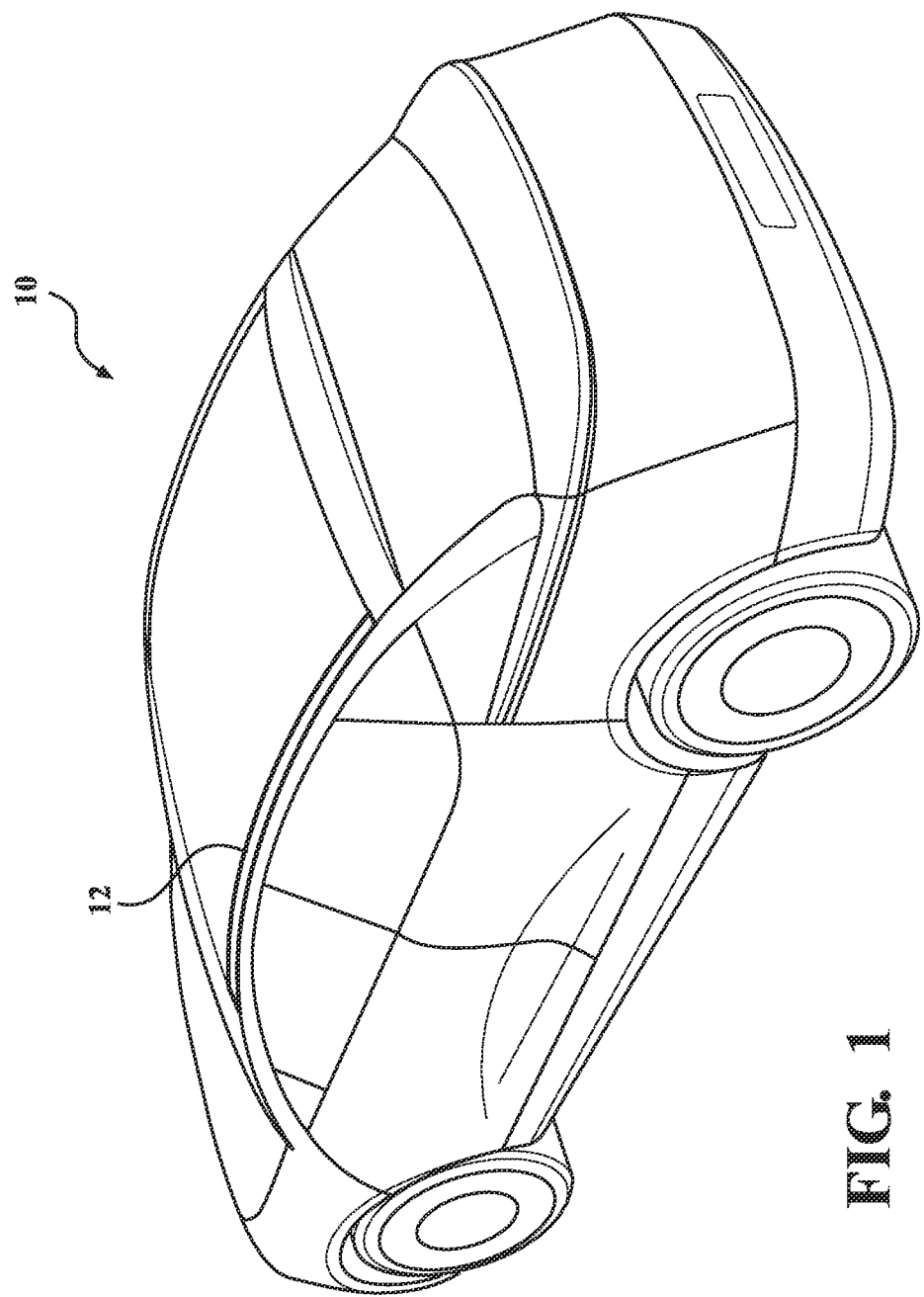
FIG. 1 is an environmental illustration of a roof ditch extrusion molding location for a use with a conventional vehicle.

Referencing first FIG. 1, an environmental illustration is generally shown at 10, of a roof ditch extrusion molding (further at 12), for a use with a conventional roof ditch location of a vehicle. Without limitation, the present invention contemplates the ability to provide the multi-layer film composition on any extruded article not limited to that utilized as a roof ditch or even limited to vehicle applications.

Figure 2:
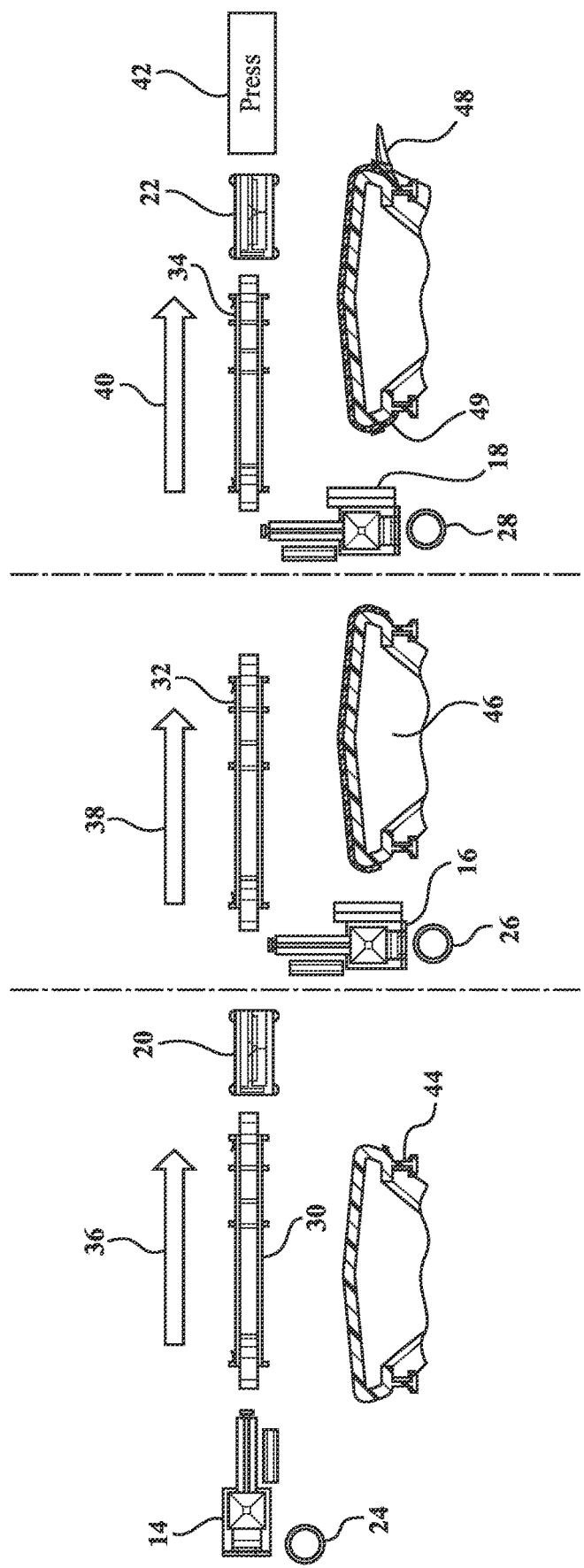
FIG. 2 is a schematic illustration of a ditch molding extrusion assembly and process according to one non-limiting application and including each of multi-stage extruder operations in combination with puller and dryer components for both forming the extruded article as well as chemically bonding the film to previously extruded (hot) substrate material and coating layer.

Referring to FIG. 2, a schematic illustration is provided of a ditch molding extrusion assembly and process according to one non-limiting application, and which depicts each of multi-stage extruder operations at locations 14, 16 and 18, these in combination with puller stations (at location 20 between first 14 and second 16 stage extruders, as well as at 22 following third 18 stage extruder). Also depicted are dryer stations 24, 26 and 28 corresponding to each extruder 14, 16 and 18.

Positioned between each extruder are elongated shaping and cooling assemblies, at 30, 32, and 34, each of which for receiving a previously formed extrudate at any stage 14, 16, and 18, such as further having been delivered through a cross head die or similar support structure (not shown) associated with the given extrusion operation. Without limitation, the extruder operations can incorporate or draw elements from any known structures, such as which are covered under U.S. Pat. No. 9,744,710 to Porter et al. and teaching an assembly and process for creating an extruded article, which in the illustrated instance includes a pipe for use in a geothermal heat recovery operation.

Similarly to as depicted in the 0710 patent, the individual assemblies 30, 32, and 34 are each configured with multiple compartments, these including initial die forming compartments which receive the extruded material delivered through a cross head die associated with the given extrusion operation, and which can include multiple spaced apart die or template portions for maintaining a desired cross sectional profile of the extruded material as it is conveyed therethrough.

The assemblies 30-34 also each include a cooling tank or similar compartment, usually succeeding the forming dies, for cooling and solidifying the die shaped extruded material (or extrudate) prior to conveying to a succeeding extrusion or post-extrusion operation. As is further known, the cooling tanks can incorporate either or both of spray or fluid immersion techniques (such using water based or other fluid coolant) for cooling and solidifying the extruded material between each formation stage.

The direction of the process flow is depicted by a series of directional arrows between beginning and end stages of the assembly. These include as depicted at 36 (between first stage extruder 14 and first puller 20 prior to cross head delivery to second stage extruder 16), at 38 (between second stage extruder 16 and third stage extruder 18) and, at 40 (following third stage extruder 18 and second puller 22) and prior to delivery to an eagle press station 42 for sectioning the completed article into suitable lengths.

As further shown, the first step of the method, article and assembly provides for the extrusion formation of a base material and profile section, this as depicted at inset view 44 corresponding with the first stage extrusion operation 14 and as shown in the basic configuration of a roof ditch style molding. Following conveyance through the first assembly 30, a second stage extrusion operation (at 16) provides for extrusion of a coating material and, following that, the separate application of a multi-layered film on the substrate material, this further depicted at inset view 46. The second stage operation can further include, as described, the chemical bonding of the multi-layer film (see as further described in FIG. 4) to the still hot and semi-molten first stage extruded material. Following the third stage extrusion 18, additional material can be formed along the film edge and which can include any of profile wings, see at 48, or other edge proximate extruded overlaying portions (see at 49), as needed for given design requirements.

Figure 3:
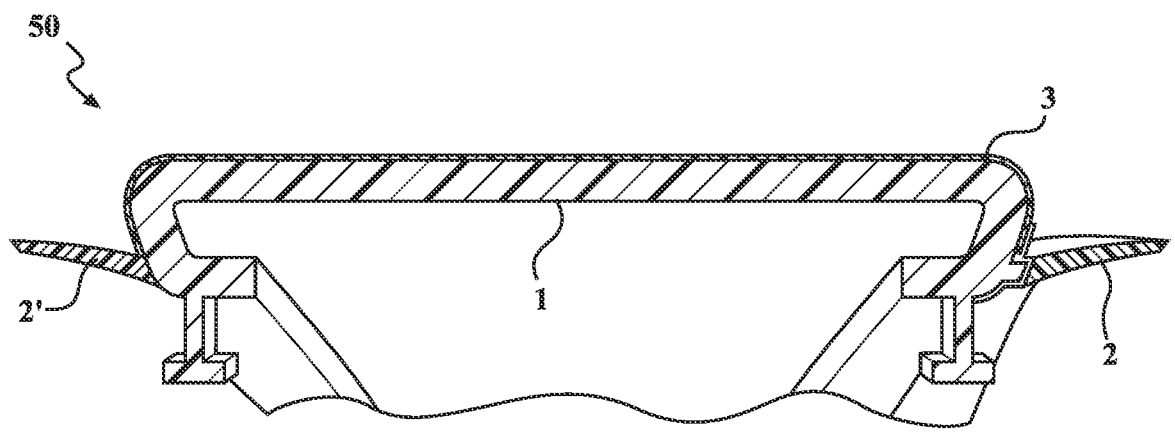
FIG. 3 is an end view illustration of a selected extruded article and depicting the multiple layers of rigid polypropylene, thermoplastic vulcanizate and outer film coating.

Referring to FIG. 3, an enlarged end view illustration similar to that previously depicted is illustrated at 50 of a selected extruded article and better showing the multiple layers of rigid polypropylene (identified at 1 and corresponding to the first extrusion stage 14 in FIG. 2), outer film (at 3 and corresponding to the post second extrusion stage 16 following application of the intermediate coating layer) and thermoplastic vulcanizate (further shown at 2 and 20 and corresponding to the portions 48 and 49 depicted in FIG. 2 according to a third extrusion stage 18), and associated with the created roof ditch article. Without limitation, the third stage extruded portions 48/49 can include any of a soft pad or other wiper configuration formed along either or both sides of the pre-extruded base material, and which again typically overlaps at least an edge of the multi-layer film 3.

Without limitation, the present invention also envisions other techniques and applications for bonding the multi-layer film directly to a first stage extruded article (and without the requirement of a second stage extruded coating material). It is also envisioned that a given multi-layer film composition could incorporated into a separate extrusion operation for forming and securing to the rigid substrate article.

Figure 4:
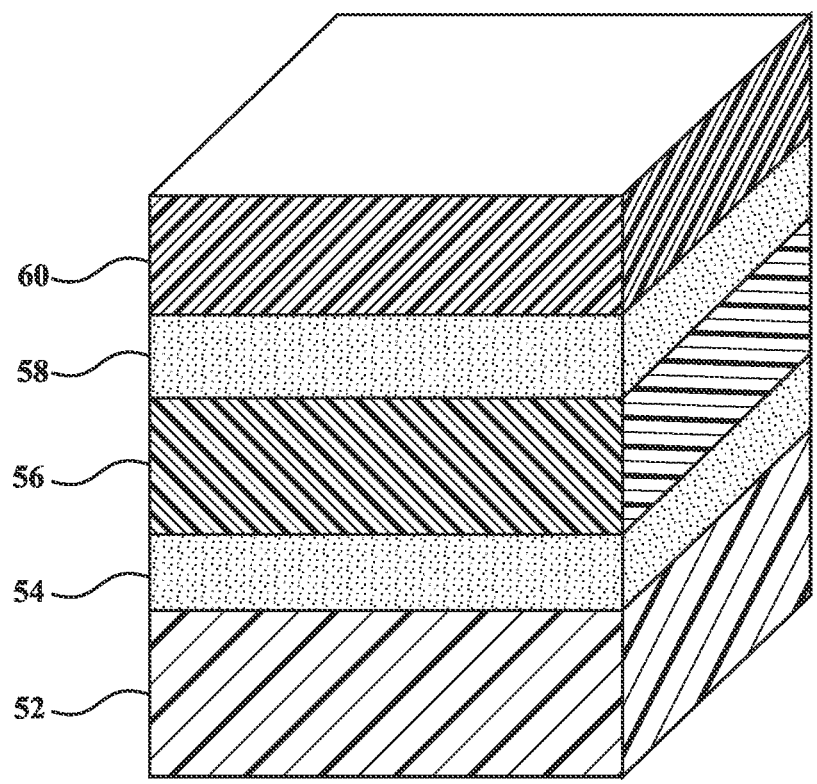
FIG. 4 is a representative illustration of a multi-layer composition of the outer film layer which is chemically bonded to the all plastic extrusion molding and which can include, without limitation, successive layers of polypropylene (PP) film, adhesive binder layer, polyethylene terephthalate (PET), coating layer and outer PET protective layer according to one non-limiting variant.

FIG. 4 is a representative illustration of a proprietary composition of a multi-layer outer film layer (again generally represented at 3) which is chemically bonded to the all plastic extrusion molding base material 1 in FIG. 3. The outer film layer in FIG. 4 also corresponds to that shown in at 3 in FIG. 3, and which can include, without limitation, successive layers of a polypropylene (PP) film 52, an adhesive binder layer 54, a polyethylene terephthalate (PET) 56, a coating layer 58 and an outer PET protective layer 60 according to one non-limiting variant. The composition, arrangement and relative application thicknesses of the individual film layers can each vary according to the desired application and it is further understood that any suitable reconfiguration of the extruder delivery structure, including injection nozzles, dies and the like, can be configured for layering and applying the secondary extruded coating prior to chemical adhesion of the film, such as again through chemical bonding techniques, to the first stage extruded article.

As shown, the polypropylene (PP) base layer 52 can be provided in a thickness range of 75 μm (micrometers), with the thicknesses of the second layer adhesive 54 at 12 μm, the third layer PET (or first subset PET layer) 56 at 50 μm, the fourth layer (super ultraviolet protecting or coated layer) at 12 µm and, finally, the fifth PET protective layer (also second PET subset layer) at 75 µm. Without limitation, the relative thickness ranges for each film layer, along with either individual material compositions can be modified from that shown in order to achieve different appearances (e.g., brightness levels along with other visual and/or environmental properties) to the extruded article.

It is also envisioned and understood that the composition, arrangement and number of film layers can be further modified from that shown without departing from the scope of the invention. This can include substituting any of the polypropylene (first 52) or polyethylene terephthalate, including each of third overall film layer (alternatively termed first subset PET layer 56), or fifth overall film layer (alternatively termed second subset PET layer 60) with other similar thermoplastic compositions, or varying the composition of the coating penultimate (fourth) coated layer 58.

Having described my invention, other and additional preferred embodiments will become apparent to those skilled in the art to which it pertains, and without deviating from the scope of the appended claims. The detailed description and drawings are further understood to be supportive of the disclosure, the scope of which being defined by the claims. While some of the best modes and other embodiments for carrying out the claimed teachings have been described in detail, various alternative designs and embodiments exist for practicing the disclosure defined in the appended claims.

The invention claimed is:

1. A process for creating an extrusion molded article incorporating an outer film, comprising the steps of:
    forming an extruded base material during a first extrusion operation;
    applying a coating layer in a second extrusion operation; and
    bonding a multi-layer film over the coating layer and to the base material while the base material is at an above ambient temperature.

2. The process of claim 1, further comprising providing the multi-layer film, in succession, with each of a polypropylene (PP) layer, an adhesive, a first polyethylene terephthalate (PET) layer, a coating and a second surface PET layer.

3. The process of claim 1, further comprising a third extrusion operation for applying wing portions in partially overlapping fashion and along an edge of the film.

4. The process of claim 3, further comprising utilizing a cross head die with each of the extrusion operations.

5. The process of claim 3, further comprising a pressing operation following the third extrusion operation for sectioning the molded article into lengths.

6. The process of claim 5, further comprising pulling the extrusion molded article following each of the first and third extrusion operations.

7. An extrusion molded article, comprising:
    an extrusion formed rigid polymer;
    an extruded coating applied over the rigid polymer;
    a multi-layer film applied over said coating and to said rigid polymer, said multi-layer film including each of a first polypropylene layer, an adhesive binder layer, at least one polyethylene terephthalate (PET) layer, and a coating layer; and
    a third stage extrusion formed profile wing configured along an edge of said second stage multi-layer film.

8. The extrusion article of claim 7, said at least one PET layer of said multi-layer film further comprising a first subset PET layer applied over said adhesive binder and a second subset PET layer applied over said coating layer.

9. The extrusion article of claim 8, said rigid polymer further comprising a polypropylene material.

10. The extrusion article of claim 9, said polypropylene material further comprising a thickness of at least 75 µm.

11. The extrusion article of claim 7, said adhesive binder of said multi-layer film further comprising a thickness of at least 12 µm.

12. The extrusion article of claim 8, said first subset PET layer of said multi-layer film further comprising a thickness of at least 50 µm.

13. The extrusion article of claim 8, said second subset PET layer of said multi-layer film further comprising a thickness of at least 75 µm.

14. The extrusion article of claim 7, said coating layer of said multi-layer film further comprising an ultraviolet protective layer.

15. The extrusion article of claim 14, said coating layer further comprising a thickness of at least 12 µm.

16. An extrusion process for creating an extrusion molded article with a chemically applied outer film, comprising the steps of:
    forming an extruded base material of a rigid polymer during a first extrusion operation;
    bonding a multi-layer film to the base material while the base material is at an above ambient temperature; and
    forming at least one wing portion along an edge of said base material during a succeeding extrusion operation and in order to overlap at least a portion of said film.

17. The process of claim 16, the step of bonding the multi-layer film further comprising bonding, in succession, each of a polypropylene (PP) layer, an adhesive, a first polyethylene terephthalate (PET) layer, a coating and a second surface PET layer.

18. The process of claim 16, further comprising utilizing a cross head die with each of the extrusion operations.

19. The process of claim 16, further comprising a pressing operation following the succeeding extrusion operation for sectioning the molded article into lengths.

20. The process of claim 16, further comprising pulling the extrusion molded article following each of the extrusion operations.

\* \* \* \* \*